US010345612B2

(12) United States Patent
Gromfeld

(10) Patent No.: US 10,345,612 B2
(45) Date of Patent: Jul. 9, 2019

(54) TRANSPARENT MATERIAL LIGHT-EMITTING MODULE WITH TWO REFLECTION FACES

(71) Applicant: VALEO VISION, Bobigny (FR)

(72) Inventor: Yves Gromfeld, Angers (FR)

(73) Assignee: VALEO VISION, Bobigny (FR)

( * ) Notice: Subject to any disclaimer, the term of this patent is extended or adjusted under 35 U.S.C. 154(b) by 3 days.

(21) Appl. No.: 16/005,287

(22) Filed: Jun. 11, 2018

(65) Prior Publication Data

US 2018/0292668 A1   Oct. 11, 2018

Related U.S. Application Data

(63) Continuation of application No. 15/228,257, filed on Aug. 4, 2016, now Pat. No. 10,139,646.

(30) Foreign Application Priority Data

Aug. 6, 2015  (FR) ...................................... 15 57584

(51) Int. Cl.
| | |
|---|---|
| *G02B 6/00* | (2006.01) |
| *F21S 41/14* | (2018.01) |
| *F21S 41/24* | (2018.01) |
| *F21S 41/27* | (2018.01) |
| *F21S 41/32* | (2018.01) |
| *F21S 41/36* | (2018.01) |
| *G02B 27/30* | (2006.01) |
| *F21S 41/147* | (2018.01) |

(Continued)

(52) U.S. Cl.
CPC .............. *G02B 27/30* (2013.01); *F21S 41/14* (2018.01); *F21S 41/147* (2018.01); *F21S 41/24* (2018.01); *F21S 41/27* (2018.01); *F21S 41/322* (2018.01); *F21S 41/36* (2018.01); *G02B 6/00* (2013.01); *F21S 41/365* (2018.01); *F21Y 2115/10* (2016.08)

(58) Field of Classification Search
CPC .. G02B 27/30; G02B 6/00; F21S 41/24; F21S 41/14; F21S 41/147; F21S 41/27; F21S 41/322; F21S 41/36
USPC ......................................................... 362/509
See application file for complete search history.

(56) References Cited

U.S. PATENT DOCUMENTS

| | | | |
|---|---|---|---|
| 7,207,705 B2 | 4/2007 | Ishida | |
| 7,513,654 B2 * | 4/2009 | Okada | ................... F21S 41/143 362/297 |

(Continued)

FOREIGN PATENT DOCUMENTS

| | | |
|---|---|---|
| DE | 10 2011 013 211 A1 | 9/2012 |
| EP | 2 719 940 A2 | 4/2014 |
| FR | 3 010 772 A1 | 3/2015 |

*Primary Examiner* — Bryon T Gyllstrom
(74) *Attorney, Agent, or Firm* — Oblon, McClelland, Maier & Neustadt, L.L.P.

(57) ABSTRACT

A light-emitting module, notably for a motor vehicle, including a translucent or transparent material body having an entry face for light rays produced by one or more light sources, a first reflection face with an edge for cutting off the rays coming from the entry face, a second reflection face for reflecting toward the exit face rays coming from the first reflection face, and an exit face for the light rays in an exit beam along an optical axis of the module. The invention also relates to a headlight including at least one such light-emitting module.

20 Claims, 3 Drawing Sheets

(51) Int. Cl.
F21S 41/365 (2018.01)
F21Y 115/10 (2016.01)

(56) References Cited

U.S. PATENT DOCUMENTS

| | | | | |
|---|---|---|---|---|
| 7,810,975 | B2* | 10/2010 | Specht | F21S 41/143 362/555 |
| 9,188,298 | B2* | 11/2015 | Ohno | F21S 41/24 |
| 2005/0162857 | A1* | 7/2005 | Tsukamoto | F21V 7/0091 362/509 |
| 2005/0180158 | A1* | 8/2005 | Komatsu | F21V 5/04 362/545 |
| 2006/0087860 | A1* | 4/2006 | Ishida | F21S 43/247 362/517 |
| 2008/0013333 | A1* | 1/2008 | Koizumi | B60Q 1/2696 362/511 |
| 2009/0073710 | A1* | 3/2009 | Sormani | G02B 6/0028 362/509 |
| 2009/0185389 | A1* | 7/2009 | Tessnow | G02B 6/0038 362/516 |
| 2009/0284980 | A1* | 11/2009 | Iwasaki | F21S 41/147 362/517 |
| 2010/0321949 | A1* | 12/2010 | Ohno | F21V 7/0091 362/538 |
| 2013/0188377 | A1* | 7/2013 | Konishi | B60Q 1/04 362/511 |
| 2014/0003071 | A1* | 1/2014 | de Lamberterie | F21S 48/24 362/487 |
| 2014/0016343 | A1 | 1/2014 | Brendle | |
| 2014/0104864 | A1 | 4/2014 | Brendle | |

* cited by examiner

TRANSPARENT MATERIAL LIGHT-EMITTING MODULE WITH TWO REFLECTION FACES

CROSS REFERENCE TO RELATED APPLICATIONS

This application is a Continuation of U.S. patent application Ser. No. 15/228,257, filed Aug. 4, 2016, which claims priority to the French Patent Application No. 1557584, filed Aug. 6, 2015. Each of the above-reference applications is hereby incorporated herein by reference in its entirety.

BACKGROUND OF THE INVENTION

1. Field of the Invention

The invention relates to the field of lighting, notably lighting for a motor vehicle. The invention also relates to a headlight including a module of this kind.

2. Description of the Related Art

The published patent document FR 3 010 772 A1 discloses a lighting module with a transparent material body having an entry face for the light produced by one or more light sources, a reflection face with a cut-off edge and an exit face of the rays. The entry face includes a cavity formed at one end of the module, in the transparent material, and delimited by a circular surface forming a diopter adapted to deflect the incoming rays towards the exterior and peripheral surface of the body. The rays are then reflected at the exterior surface, by application of the principle of total internal reflection, to converge toward the cut-off edge. The exit face is generally convex and is at the opposite end of the module. The reflection face is formed by a notch formed in a lateral portion of the transparent material, between the entry and exit faces. The edge in the recess of the notch forms the cut-off edge for the rays and the face of the notch situated beside the entry face forms a reflection face by virtue of the principle of total internal reflection. This reflection face is commonly referred to as the "bender" in that it "bends" some of the rays toward the bottom of the beam. The rays coming from the entry face propagate in the transparent material essentially along the longitudinal and optical axis of the module. Most of the rays pass the cut-off edge without being reflected and exit via the exit face. Some of the rays encounter the reflection or bender face disposed in front of the cut-off edge, where they are reflected toward an upper portion of the transparent body. These rays then encounter the exit face with a high angle of incidence. They are therefore subjected there to strong refraction and are directed toward a lower portion of the light beam. Thus, the edge of the bender makes it possible to produce a horizontal cut off in the light beam. This module is beneficial in that it makes it possible to produce with a very small number of components a high-performance light beam with a cut-off. However, it has the disadvantage that it requires a certain amount of space along the optical axis. In fact the transparent body extends along its longitudinal axis essentially along the optical axis of the module. Moreover, because of its shape the exit face cannot serve as a styling face, i.e. one directly visible from the outside of the lighting device including the module. It is therefore necessary to provide an additional styling surface, which also increases the overall size.

SUMMARY OF THE INVENTION

The invention has the objective of alleviating at least one problem of the prior art, in this instance the prior art mentioned above. To be more precise, the invention has the objective of proposing a light-emitting module that is compact, in particular along its optical axis.

The invention consists in a light-emitting module, notably for a motor vehicle, including a translucent or transparent material body having an entry face for light rays produced by one or more light sources; a first reflection face with an edge for cutting off the rays coming from the entry face; an exit face for light rays in an exit beam along an optical axis of the module; noteworthy in that it further includes a second reflection face for reflecting toward the exit face rays coming from the first reflection face.

In accordance with one advantageous embodiment of the invention, the first reflecting face forms a diopter adapted to reflect by the principle of total internal reflection some of the rays coming from the entry face.

In accordance with one advantageous embodiment of the invention, the first reflection face forms an angle between 5° and 40° inclusive with the mean direction of the light beams propagating from the entry face to the reflection face.

In accordance with one advantageous embodiment of the invention, the first reflection face comprises two adjacent portions forming an edge directed toward the second reflection face and/or the exit face, the portions forming, transversely to the edge, a convex profile.

In accordance with one advantageous embodiment of the invention, the cut-off edge is formed by the intersection of the first reflection face with an intermediate face situated between the first reflection face and the second reflection face, the first reflection face and the intermediate face forming a concave profile.

In accordance with one advantageous embodiment of the invention, the intermediate face comprises two adjacent portions forming an edge directed toward the second reflection face, the portions forming, transversely to the edge, a convex profile.

In accordance with one advantageous embodiment of the invention, the second reflection face extends between the intermediate face and the exit face.

In accordance with one advantageous embodiment of the invention, the second reflection face is generally curved and convex.

In accordance with one advantageous embodiment of the invention, the second reflection face forms a diopter adapted to reflect, by the principle of total internal reflection, the rays coming from the first reflection face.

In accordance with one advantageous embodiment of the invention, the body includes a first portion extending from the entry face as far as the second reflection face in a principal direction forming an angle between 60° and 120° inclusive with the optical axis.

In accordance with one advantageous embodiment of the invention, the module includes a second portion extending from the second reflection face as far as the exit face along the optical axis.

In accordance with one advantageous embodiment of the invention, the entry face includes one or more collimators adapted to deflect the light rays from one or more respective light sources so as to form one or more beams of rays directed toward the second reflection face and passing in front of the cut-off edge.

In accordance with one advantageous embodiment of the invention, the collimator, or each of the collimators, is formed by a protuberance of the body with a circular exterior surface preferably having an elliptical profile, the protuberance including a cavity adapted to receive the corresponding light source.

In accordance with one advantageous embodiment of the invention, the entry face includes one or more collimators adapted to deflect the light rays from one or more respective light sources toward a convergence point or segment situated on the cut-off edge.

In accordance with one advantageous embodiment of the invention, the collimator or each of the collimators is formed by a protuberance of the body having a circular exterior surface having an elliptical profile and a cavity adapted to receive the corresponding light source.

In accordance with one advantageous embodiment of the invention, there are at least three collimators and they form on the entry face at least one row extending perpendicularly to the optical axis.

In accordance with one advantageous embodiment of the invention, the module includes the light sources, the sources being of the semiconductor light source type, for example of the light-emitting diode type, disposed on a common board.

In accordance with one advantageous embodiment of the invention, the exit beam is a lighting beam with a horizontal or vertical cut-off.

The invention also consists in a headlight for a motor vehicle including a housing and at least one light-emitting module, noteworthy in that the light-emitting module is one in accordance with the invention.

In accordance with one advantageous embodiment of the invention, the headlight includes two of the light-emitting modules disposed side by side and the exit beams of which are superposed, one of the modules forming an extended beam with a generally straight cut-off and the other forming a narrow beam with a horizontal cut-off with a kink.

In accordance with one advantageous embodiment of the invention, the exit face of the light-emitting module is a styling surface, i.e. a surface visible from the outside of the headlight.

The measures of the invention are beneficial in that they make it possible to produce a light-emitting module that is particularly compact in the direction of the optical axis, i.e. the longitudinal axis of the vehicle. The use of a dioptric bender, i.e. with the first reflection face reflecting the rays by the principle of total internal reflection, is notably advantageous in that it renders the module more tolerant to focusing defects. Moreover, the use of a plurality of collimators on the entry face makes it possible to compose the light beam and therefore confers great flexibility in the implementation of different functions. Moreover, the module has a common exit face, which has advantages in terms of aesthetics and the precision of the total beam resulting from the addition of the beams produced by the various collimators.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the aid of the description and the drawings, in which.

DETAILED DESCRIPTION OF THE PREFERRED EMBODIMENTS

Figure 1:
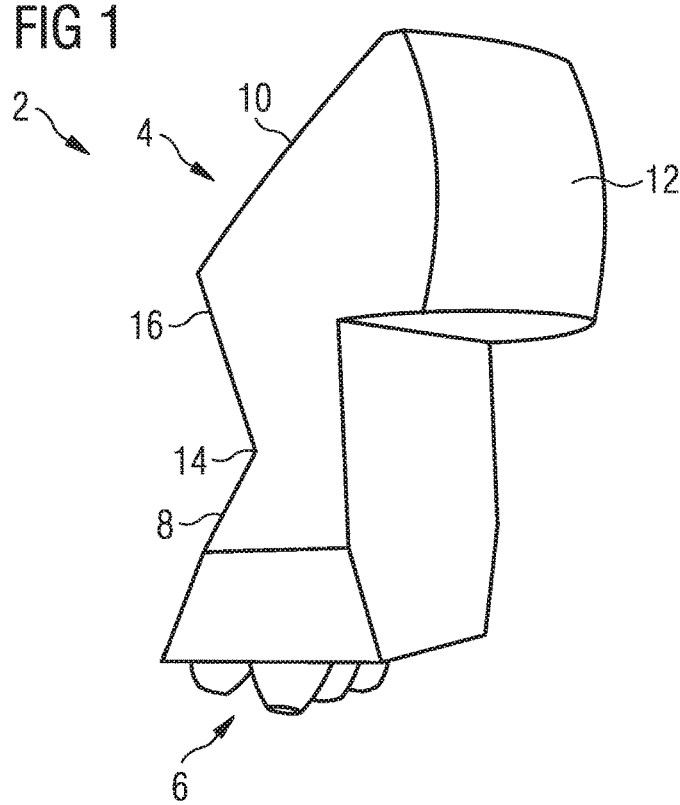
FIG. 1 is a perspective view of a light-emitting module in accordance with the invention.

In the following description, relative terms such as "top", "upper", "bottom", "lower", "front" and "rear" are to be understood in relation to the orientation of the light-emitting module 2 as shown in the figures, it being understood that in practice the light-emitting module 2 can assume other orientations.

FIGS. 1 to 4 illustrate a light-emitting module 2 in accordance with the invention. The light-emitting module 2 essentially comprises a body 4 and light sources (not represented).

The body 4 is made mainly, preferably totally, from a transparent or translucent material. That material may be glass or preferably plastic, such as polycarbonate (PC) in particular.

The body 4 includes an entry face 6 for the light produced by the light sources. The latter may be light-emitting diodes or of the laser type. The body 4 also includes a first reflection face 8 intended to reflect only some of the rays, a second reflection face 10, intended to reflect virtually all of the rays, and an exit face 12.

The entry face 6 may include collimators 61 and 62. They are more visible in FIG. 4. Here they may form protuberances projecting from the body 4 and forming an exterior surface that may be generally circular. Each of these protuberances includes a cavity intended to receive one of the light sources. The interior surface of the protuberances delimiting the cavity forms a first diopter with the surrounding air, causing refraction of the rays passing through it. The exterior surface of the protuberances forms a second diopter with the surrounding air. As a function of the angle of incidence of the rays encountering it, the latter may be reflected by the principle of total internal reflection. In fact, in geometrical optics, the phenomenon of total internal reflection occurs if a light ray arrives at the surface of separation of two media with different optical indices with an angle of incidence greater than a critical value: there is then no longer any transmitted refracted ray and there remains only a reflected ray. This limiting angle of incidence $\theta$ is obtained by application of the Snell-Descartes law, namely $$\theta = \sin^{-1}\frac{n_2}{n_1},$$

where $n_2$ is the refractive index of air and $n_1$ is the refractive index of the transparent or translucent material forming the protuberance. For a material such as polycarbonate with a refractive index of the order of 1.591, the limiting refraction angle $\theta$ is of the order of 39°. The exterior surface of the protuberances forming the second diopters may have a parabolic or elliptical profile.

Figure 2:
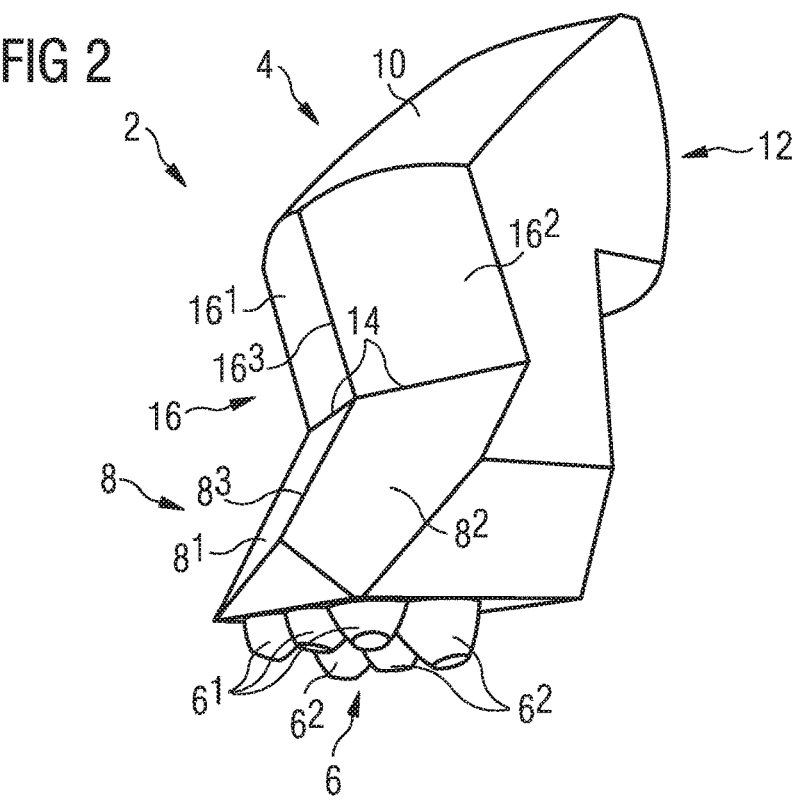
FIG. 2 is a rear perspective view of the module from FIG. 1.
Figure 3:
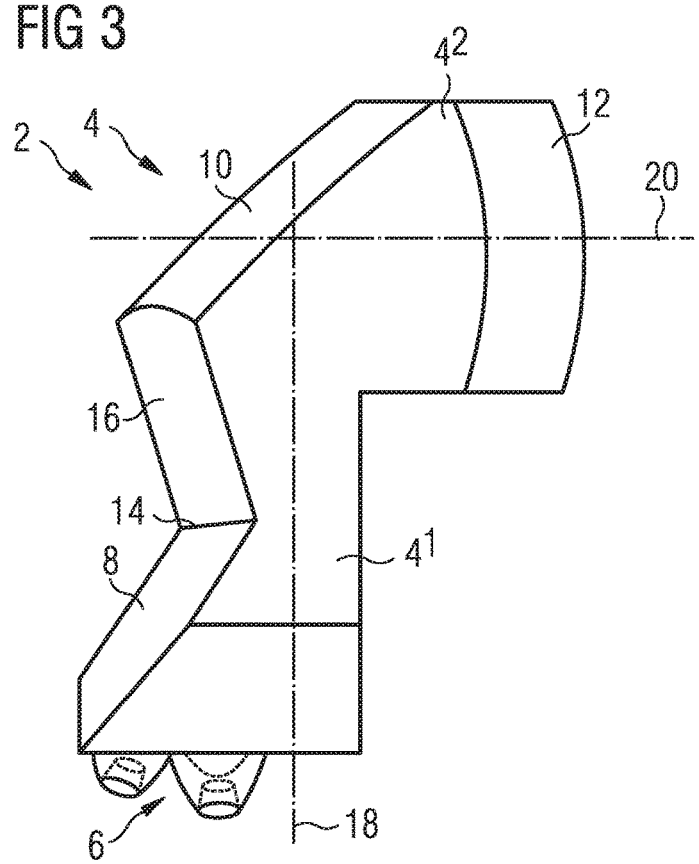
FIG. 3 is a view in section on a longitudinal median plane of the module from FIGS. 1 and 2.
Figure 4:
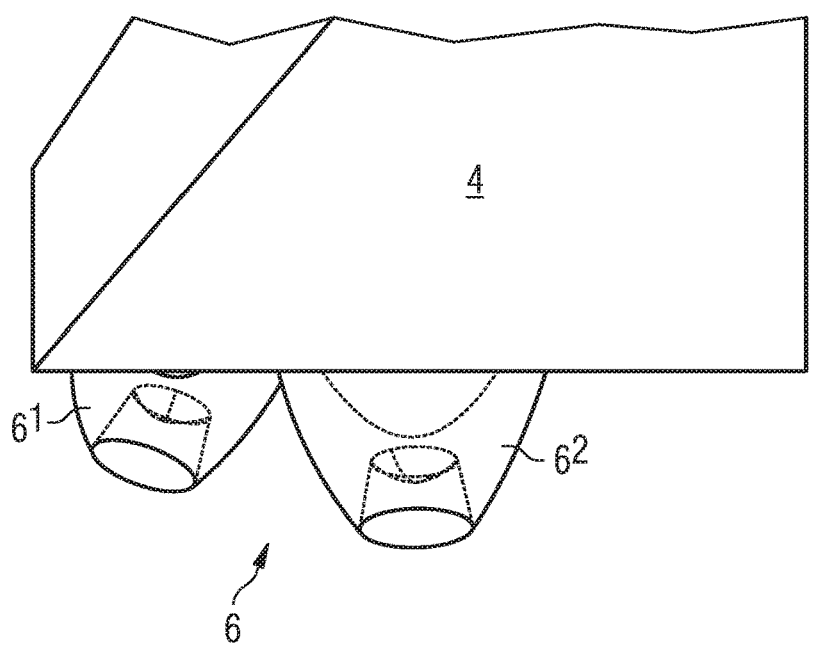
FIG. 4 is a perspective detail view of the lower portion of the module from FIGS. 1 to 3.

The body 4 of the light-emitting module 2 includes an intermediate face 16 between the first reflection face 8 and the second reflection face 10. As can be seen in FIGS. 2 and 3 in particular, the intermediate face 16 and the first reflection face 8 have a concave profile and form at their intersection an edge 14 cutting off the rays propagating in the body 4. In fact, most of the rays propagate from the entry face 6 to the second reflection face 10, passing in front of the cut-off edge 14, i.e. without undergoing intermediate reflection. Now some of the rays coming from the entry face 6 encounter the first reflection face 8, to be more precise the portion of the face that is adjacent the cut-off edge 14. Those rays are then reflected, advantageously by the principle of total internal reflection (described above in relation to the protuberances 61 and 62 of the entry face 6). In this case, the first reflection face 8 does not need to receive a reflective treatment. The effect of the reflection of some of the rays by the first reflection face 8 is to direct those rays toward an upper portion of the second reflection face 10 and/or of the exit face 12, with high angles of incidence having the effect of refracting these rays toward a bottom portion of the light beam. In conjunction with the cut-off edge 14, the first reflection face 8 is commonly referred to as a "bender", in that it "bends" some of the rays toward a bottom portion of the light beam, thus providing a beam horizontal cut-off function.

The first reflection face 8 advantageously forms an angle between 5° and 40° inclusive with the mean direction of the light beams propagating from the entry face 6 to the first reflection face 8.

In FIG. 2, it can be seen that the first reflection face 8 may comprise two adjacent portions 81 and 82, those two portions forming an edge 83. The same applies to the intermediate face 16, which may likewise comprise two portions 161 and 162 forming an edge 163. The two edges 83 and 163 are advantageously aligned and adjacent end-to-end. As a result, in this configuration, the cut-off edge 14 is not rectilinear but constituted of two end-to-end adjacent segments.

The second reflection face 10 may be generally curved, here convex as seen from the outside of the body 4. The same applies to the exit face 12. The second reflection face 10 advantageously reflects the rays by the principle of total internal reflection (described above in relation to the collimators or protuberances 61 and 62 of the entry face 6). In this case, the second reflection face 10 does not need to receive a reflective treatment.

Referring to FIG. 3, the body 4 may include a first portion 41 extending generally along a longitudinal axis that is generally transverse, advantageously perpendicular, to the entry face 6. The angle formed by these two axes is advantageously between 60° and 120° inclusive. The rays therefore generally propagate along the longitudinal axis 18, from the entry face 6 as far as the second reflection face 10, some of them being reflected at the first reflection face 8. The body 4 may equally include a second portion 42 extending transversely to the first portion 41 and generally along the optical axis 20. The latter represents the mean direction of the light rays leaving the exit face 12.

Figure 5:
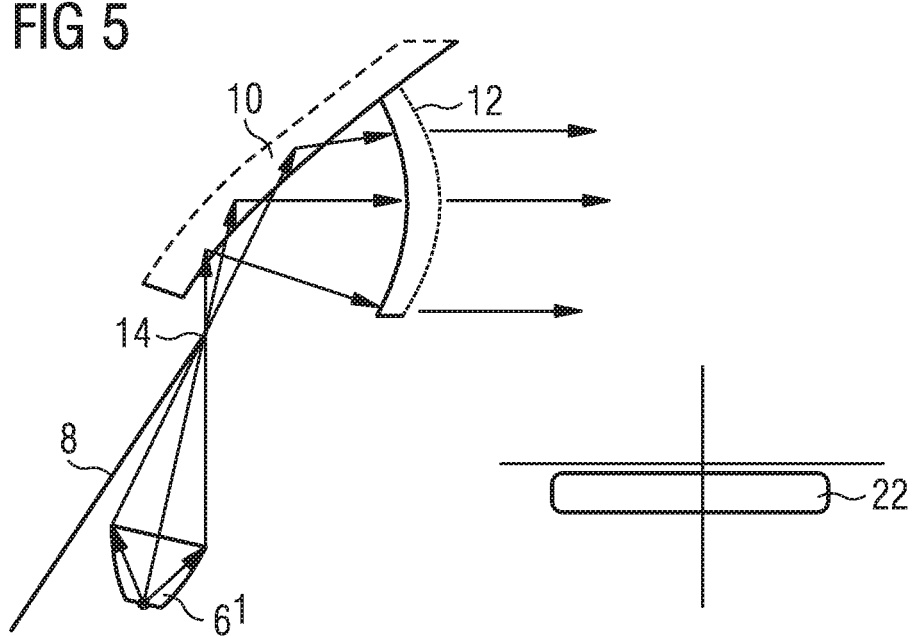
FIG. 5 is a diagrammatic representation of the path of some of the rays from the module from FIGS. 1 to 4.
Figure 6:
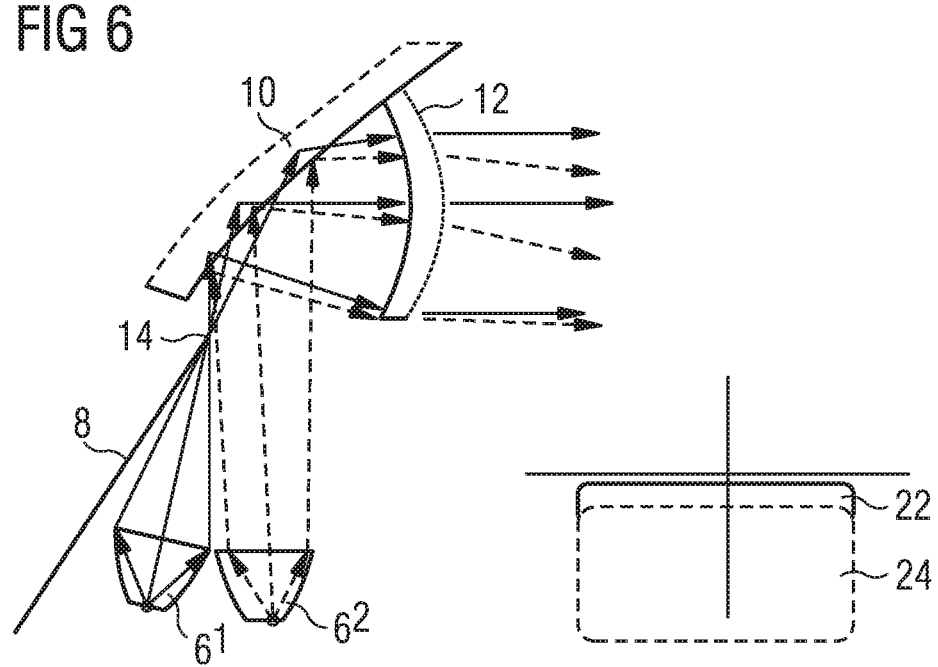
FIG. 6 is a diagrammatic representation of the path of the rays from the module of FIGS. 1 to 4.

FIGS. 5 and 6 illustrate the principle of propagation of the rays inside the body 4 of the light-emitting module 2 from FIGS. 1 to 4.

In FIG. 5 it can be seen that the light rays produced by the collimator 61 converge at a focal point or segment passing through the cut-off edge 14. This means that the majority of the rays coming from the focus collimator 61 in question pass in front of or over the cut-off edge 14 without being reflected. Those rays then encounter the second reflection face 10 to be reflected here in the direction of the exit face 12. The curvatures of the second reflection face 10 and/or the exit face 6 are calculated to form a light beam along the optical axis 20 of the light-emitting module 2. Here, the rays coming from the collimator or collimators 61 form the portion 22 of the beam, namely the upper portion with the cut-off edge 14.

FIG. 6 shows the path of the light rays produced by the collimator 61, as shown in FIG. 5, with, additionally, the light rays produced by the collimator 62. See the description of FIG. 5 for the rays from the collimator 61. It can be seen that the rays produced by the collimator 62 are generally parallel to one another and most pass in front of the cut-off edge 14. As can be seen in FIG. 6, these rays encounter the second reflection face 10 with lower angles of incidence than the rays coming from the other collimator 61. These rays are then reflected in directions such that, after refraction through the exit face 12, they form the lower portion 24 of the light beam.

The conjugation of the two types of collimators 61 and 62 therefore makes it possible to form a beam with a controlled cut-off and a homogeneous and powerful lower portion.

As can be seen in FIGS. 1 to 4, the entry face 6 may include a plurality of focus collimators 61 and a plurality of collimators 62. These two types of collimators 61 and 62 are disposed in rows extending transversely to the optical axis 20. Each of the collimators 61 and 62 of a row therefore makes it possible to contribute to the formation of the beam in a lateral direction. The focus collimator or collimators 61 is/are advantageously disposed behind the other collimators 62.

In FIGS. 5 and 6 it can be seen that the cut-off produced appears to be generally rectilinear. Now, the regulations impose what is commonly referred to as a "kink". The kink of the cut-off may be produced by the light-emitting module 2 by means of an appropriate profile of the cut-off edge 14. Alternatively, the kink may be produced by another light-emitting module 2 disposed beside the light-emitting module 2 from FIGS. 1 to 6, the beam from which is added to the beam produced by the principal light-emitting module 2.

The light sources of the light-emitting module or modules 2 may be disposed on a common support, such as a printed circuit board, for example.

One or more light-emitting modules 2 as described above may be integrated into a housing in order to produce a headlight.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light-emitting module for a motor vehicle, including a translucent or transparent material body comprising:
   an entry face for entry light rays produced by one or more light sources and entering said body;
   a first reflection face with a cut-off edge for cutting off the entry light rays coming from said entry face such that a first portion of the entry light rays is reflected from the first reflection face toward a second reflection face, and a second portion of the entry light rays passes by the cut-off edge without being reflected by the first reflection face and is directly incident of said second reflection face;
   an exit face for providing exit light rays in an exit beam along an optical axis of said light-emitting module, wherein said second reflection face reflects said first portion of the entry light rays coming from the first reflection face toward the exit face, and reflects said second portion of the entry light rays coming from the entry face toward the exit face.

2. The light-emitting module according to claim 1, wherein said first reflection face forms a diopter adapted to reflect, by a principle of total internal reflection, said first portion of the entry light rays coming from said entry face.

3. The light-emitting module according to claim 1, wherein said first reflection face forms an angle between 5° and 40° inclusive, with respect to a mean direction of the entry light rays propagating from said entry face to said first reflection face.

4. The light-emitting module according to claim 1, wherein said first reflection face comprises two adjacent portions forming a first edge, said two adjacent portions forming, transversely to said first edge, a convex profile.

5. The light-emitting module according to claim 1, wherein said cut-off edge is formed by an intersection of said first reflection face with an intermediate face situated between said first reflection face and said second reflection face, said first reflection face and said intermediate face forming a concave profile.

6. The light-emitting module according to claim 5, wherein said intermediate face comprises two adjacent portions forming a second edge, said two adjacent portions forming, transversely to second said edge, a convex profile.

7. The light-emitting module according to claim 5, wherein said second reflection face extends between said intermediate face and said exit face.

8. The light-emitting module according to claim 1, wherein said second reflection face is generally curved and convex.

9. The light-emitting module according to claim 1, wherein said second reflection face forms a diopter adapted to reflect, by a principle of total internal reflection, said first portion of the entry light rays coming from said first reflection face.

10. The light-emitting module according to claim 1, wherein said translucent or transparent material body includes a first portion extending from said entry face to said second reflection face in a principle direction forming an angle of between 60° and 120°, inclusive, with respect said optical axis.

11. The light-emitting module according to claim 10, wherein said translucent or transparent material body includes a second portion extending from said second reflection face to said exit face along said optical axis.

12. The light-emitting module according to claim 1, wherein said entry face includes one or more collimators adapted to deflect the light rays from one or more respective light sources so as to form one or more beams of rays directed toward said second reflection face and passing in front of said cut-off edge.

13. The light-emitting module according to claim 12, wherein at least one of said one or more collimators is formed by a protuberance of said translucent or transparent material body with a circular exterior surface preferably having an elliptical profile, said protuberance including a cavity adapted to receive a corresponding light source.

14. The light-emitting module according to claim 1, wherein said entry face includes one or more collimators adapted to deflect the light rays from one or more light sources, respectively, toward a convergence point or segment situated on said cut-off edge.

15. The light-emitting module according to claim 14, wherein at least one of said one or more collimators is formed by a protuberance of said translucent or transparent material body having a circular exterior surface having an elliptical profile and a cavity adapted to receive a corresponding light source.

16. The light-emitting module according to claim 1, wherein an exit beam is a lighting beam with a horizontal or vertical cut-off.

17. A headlight for a motor vehicle including a housing and at least one light-emitting module, wherein said at least one light-emitting module according to claim 1.

18. The headlight according to claim 17, wherein said exit face of said at least one light-emitting module is a styling surface.

19. The light-emitting module according to claim 2, wherein said first reflection face forms an angle between 5° and 40° inclusive with a mean direction of the light rays propagating from said entry face to said reflection face.

20. The light-emitting module according to claim 2, wherein said first reflection face comprises two adjacent portions forming an edge directed toward said second reflection face and/or said exit face, said two adjacent portions forming, transversely to said edge, a convex profile.

* * * * *